(12) United States Patent
Aron et al.

(10) Patent No.: US 10,489,059 B2
(45) Date of Patent: *Nov. 26, 2019

(54) TIER-OPTIMIZED WRITE SCHEME

(71) Applicant: Cohesity, Inc., San Jose, CA (US)

(72) Inventors: Mohit Aron, Los Altos, CA (US); Ganesha Shanmuganathan, San Jose, CA (US)

(73) Assignee: Cohesity, Inc., San Jose, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/154,556

(22) Filed: Oct. 8, 2018

(65) Prior Publication Data

US 2019/0042104 A1    Feb. 7, 2019

Related U.S. Application Data

(63) Continuation of application No. 15/628,445, filed on Jun. 20, 2017, now Pat. No. 10,120,587, which is a continuation of application No. 14/684,536, filed on Apr. 13, 2015, now Pat. No. 9,696,913.

(51) Int. Cl.
*G06F 3/06* (2006.01)
*G06F 12/08* (2016.01)
*G06F 12/02* (2006.01)

(52) U.S. Cl.
CPC .......... *G06F 3/0611* (2013.01); *G06F 3/0643* (2013.01); *G06F 3/0656* (2013.01); *G06F 3/0685* (2013.01); *G06F 12/0238* (2013.01); *G06F 12/08* (2013.01); *G06F 2003/0691* (2013.01); *G06F 2003/0692* (2013.01); *G06F 2212/1016* (2013.01); *G06F 2212/217* (2013.01)

(58) Field of Classification Search
CPC .... G06F 3/0611; G06F 3/0643; G06F 3/0655; G06F 3/0685; G06F 12/0238; G06F 12/0246; G06F 12/08
See application file for complete search history.

(56) References Cited

U.S. PATENT DOCUMENTS

| | | |
|---|---|---|
| 8,549,222 B1 | 10/2013 | Kleiman |
| 9,043,530 B1 | 5/2015 | Sundaram |
| 2012/0166749 A1 | 6/2012 | Eleftheriou |
| 2015/0242309 A1 | 8/2015 | Talagala |
| 2015/0309941 A1 | 10/2015 | Franceschini |

*Primary Examiner* — Hal Schnee
(74) *Attorney, Agent, or Firm* — Van Pelt, Yi & James LLP

(57) ABSTRACT

A request to write data corresponding to at least a first portion of a file is received. It is determined whether to perform the request either as an in-place write or as an out-of-place write. Performing the in-place write comprises performing a write to a low latency storage device, and performing the out-of-place write comprises performing a write to a higher latency storage device. The request is performed as either the in-place write or the out-of-place write based on the determination. Performing the request as the in-place write includes writing the data to a first location on a storage tier storing the first portion of the file, and performing the request as the out-of-place write includes writing the data to a second location on one of a plurality of storage tiers of a computing node, other than the first location.

20 Claims, 7 Drawing Sheets

TIER-OPTIMIZED WRITE SCHEME

CROSS REFERENCE TO OTHER APPLICATIONS

This application is a continuation of U.S. patent application Ser. No. 15/628,445 entitled TIER-OPTIMIZED WRITE SCHEME filed Jun. 20, 2017, which is a continuation of U.S. patent application Ser. No. 14/684,536, now U.S. Pat. No. 9,696,913, entitled TIER-OPTIMIZED WRITE SCHEME filed Apr. 13, 2015, all of which are incorporated herein by reference for all purposes.

BACKGROUND

Field

Embodiments presented herein generally relate to optimizing a tiered storage system. More specifically, embodiments presented herein provide a tiered storage system optimized to perform write operations.

Description of the Related Art

A distributed computing system includes multiple computer systems which interact with one another to achieve a common goal. Computer systems in the distributed computing system share different resources, such as data, storage, processing power, and the like.

One storage configuration for a distributed computing system includes hard disk drives (HDDs) that store data supported by a cache stored in a solid state drive (SSD). When the system performs write I/O operations file, the system can write the data either in-place or out-of-place. Generally, in-place write operations are more efficiently performed in SSDs than HDDs due to lower seek time needed to access data. However, SSDs typically have a lower capacity than HDDs. Therefore, the SSDs are often used to provide a cache for the HDDs, which ultimately store the data.

Sequential writes are more efficient than writes performed to random locations. To address this, the system frequently improves performance by performing writes "out-of-place." To do so, a write operation is first performed to a new location on disk instead of overwriting data in a currently existing location. The new location may then be referenced. As a result, the old location contains unreferenced data. The system must then perform garbage collection at the old location so that other data may be written to that location.

SUMMARY

Embodiments presented herein provide a method for storing data in a plurality of storage tiers on a computing node. The method generally includes receiving a request to write data corresponding to at least a first portion of a file. The method also includes determining whether to perform the request either as an in-place write or as an out-of-place write. Upon determining to perform the request as the in-place write, the data is written to a first location on a storage tier which currently stores the first portion of the file. Upon determining to perform the request as the out-of-place write, the data is written to a second location on one of the storage tiers, other than the first location.

Other embodiments include, without limitation, a computer-readable medium that includes instructions that enable a processing unit to implement one or more aspects of the disclosed methods as well as a system having a processor, memory, and application programs configured to implement one or more aspects of the disclosed methods.

DETAILED DESCRIPTION OF THE PREFERRED EMBODIMENTS

Figure 1:
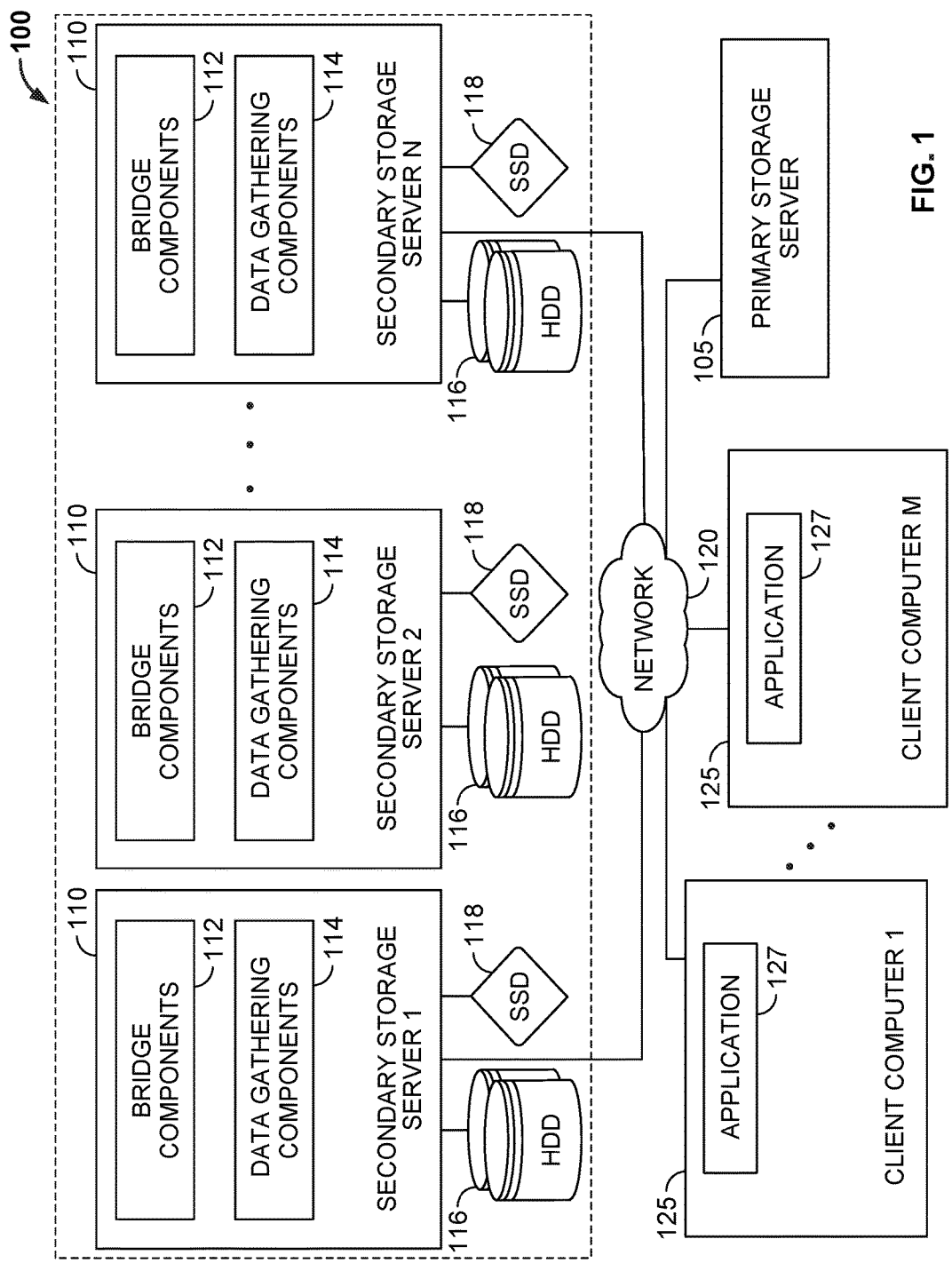
FIG. 1 illustrates an example computing environment, according to one embodiment.

Embodiments presented herein provide a tiered storage system for a distributed computing system cluster. More specifically, embodiments describe techniques for optimizing write operations by using a tiered storage system. In one embodiment, each system in a distributed cluster includes both solid state drives (SSD) and hard disk drives (HDDs). Further, the SSD acts as an upper tier for storing hot data, i.e., data currently being accessed by clients of the tiered storage system. Because HDDs generally provide much larger storage capacity than SSDs (at a much lower cost per unit of space), HDDs act as a lower tier for storing cold data, i.e., data that are not currently being accessed by clients of the tiered storage system.

In one embodiment, a node in the cluster may receive a request to write data to a file. If the portion of the file specified in the request does not contain any prior data, then chunks corresponding to that portion do not exist. In such a case, the node writes the data out-of-place to newly-created chunks. In a storage node, chunks can be stored on either the SSD or the HDD. The new chunks may be created on either the SSD or the HDD based on an incoming I/O access pattern. If the pattern is random, then the node creates the new chunks on SSD. On the other hand, if the pattern is sequential, then the node creates the new chunks on HDD. Further, regardless of whether the chunks are written to the SSD or HDD, the node writes the chunks sequentially.

Otherwise, if chunks corresponding to the portion of the file in the request already exist, the node writes the data to a chunk containing the portion of the file to be written to. In one embodiment, when a node in the cluster receives a request to write data to a file, the tiered storage system writes the data to a portion of the file currently being written to in-place on the SSD (i.e., updates the data in corresponding chunks) provided that no overriding conditions exist. Examples of such overriding conditions are whether the corresponding chunks are immutable (e.g., the chunks are deduplicated), whether the chunks are part of a compressed group, and whether the corresponding chunks are currently stored on HDD and the incoming access pattern is random.

If any of those conditions are satisfied, then the node writes the data out-of-place to SSD or HDD (based on the underlying access pattern).

Embodiments presented herein may be adapted to a variety of storage systems, e.g., primary storage systems, secondary storage systems, etc. For example, consider a secondary storage system used to backup data stored in a primary storage system. The secondary storage system may do so by creating snapshots of the primary storage systems at specified intervals. The secondary storage system may capture snapshots of relatively large storage objects, such as virtual machine disk objects, databases, and the like. In addition, clients may access copies of the snapshot for a variety of purposes (e.g., test and development). Thus, the secondary storage system may need to perform multiple random I/O operations on large amounts of data at any given time. Based on the services provided by the secondary storage system, data maintained by the system may, at any time, go from hot to cold, and vice versa.

In one embodiment, nodes of the secondary storage system may provide multiple storage tiers for storing backups of the primary storage system. For example, an upper tier backed by a SSD may handle random write operations, while a lower tier backed by HDD(s) may provide very large storage capacity. Generally, when a node receives a request to write to a portion of the file in the SSD, the node writes directly in-place (i.e., overwrite the existing chunks) in the SSD. The SSD can perform in-place write operations more efficiently than an HDD.

Further, the node may also decide whether to write data in the upper tier or the lower tier based on properties of the corresponding data chunk and the write operation. For example, the node first determines whether a portion of the file corresponding to a write request is associated with existing chunks. If not, the node creates new chunks sequentially and writes the data to the new chunks. The node may create the new chunks in the SSD or HDD based on an incoming access pattern. For instance, if the incoming pattern is random, then the chunks are created on SSD. Otherwise, if the incoming pattern is sequential, then the chunks are created on HDD. If the portion of the file is associated with existing chunks, the node writes in-place to SSD if no overriding conditions exist. For example, the node may write out-of-place if the chunks correspond to a compressed group of chunks. Doing so results in more efficient performance, i.e., rather than decompress the group, update the data chunk on the HDD, and re-compress the group, the node instead writes the chunk on the SSD. Further, the node may also write out-of-place if the chunks are deduplicated. In addition, the node may write-out-of-place if the incoming access pattern is random and the chunks are located on the HDD.

The tiered storage system disclosed herein determines whether to write a file chunk to in-place or out-of-place within the secondary storage system based on various factors such as whether the data is currently accessed and the location and properties of a targeted file chunk (if the chunk currently exists). Advantageously, doing so allows the tiered storage to optimally perform in-place or out-of-place write operations as well as send as many write operations to the SSD relative to the HDD. Doing so reduces overhead incurred in performing random I/O operations to HDD by fully utilizing faster writes to the SSD. Further, when writing data to the HDD, the node can group chunks of data to write together in a given area of the HDD, allowing for sequential performance.

Note, embodiments are described using a distributed secondary storage system as a reference example of a computing system which can take advantage of a tiered storage system described herein. However, one of ordinary skill in the art will recognize that the tiered storage system may be adapted to efficiently store data for a variety of computing systems.

FIG. 1 illustrates an example computing environment 100, according to one embodiment. As shown, the computing environment includes a primary storage server 105 and a distributed cluster 122. The distributed cluster 122 includes multiple computing servers 110 configured to host and manage a service (e.g., secondary storage services). The primary storage server 105 and secondary storage servers 110 are each connected via a network 120. The primary storage server 105 and secondary storage servers 110 may provide storage for a large data center.

In this example embodiment, secondary storage servers 110 provide backup storage and services to the primary storage server 105. The backup services may be workloads for copying data to tape disks, moving data to a cloud provider, and performing test and development tasks using a clone of the backup data. As shown, each secondary storage server 110 (or "node") includes bridge components 112 and data gathering components 114. The bridge components 112 may allow external clients to access each node. The data gathering components 114 retrieve data from primary storage server 105 (e.g., by communicating with the primary storage server 105 using a backup protocol). Further, each node includes one or more hard disk drives (HDDs) 116 and solid-state drives (SSDs) 118 for storing data from primary storage server 105. The SSDs 118 increase the performance running secondary storage transactions, such as non-sequential write transactions.

Further, the SSDs 118 and HDDs 116, together, provided a tiered storage system which can efficiently perform a large volume of write operations. The SSDs 118 form an upper tier that stores "hot" data (i.e., file chunks that are frequently accessed by the secondary storage server 110). The HDDs 116 form a lower tier that storages "cold" data (i.e., file chunks that are not currently accessed by the secondary storage server 110).

Figure 2:
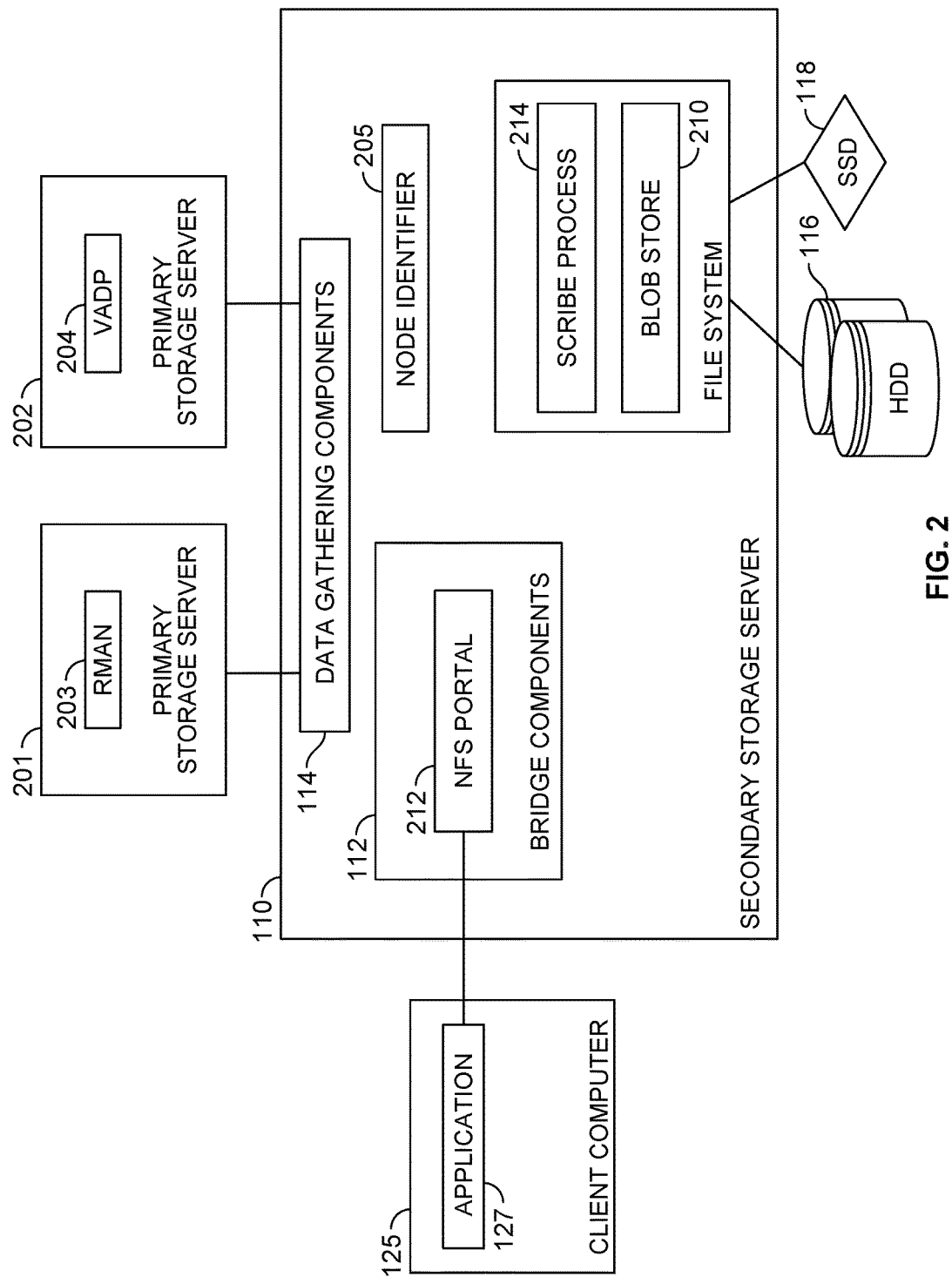
FIG. 2 illustrates an example secondary storage server, according to one embodiment.

FIG. 2 further illustrates an example secondary storage server 110, according to one embodiment. As shown, the secondary storage server 110 includes bridge components 112, data gathering components 114, a node identifier 205, and a file system 210.

As stated, the data gathering components 114 may communicate with primary storage servers in the computing environment 100. To do so, the data gathering components 114 may include adapters specific to communicating with backup protocols hosted on primary storage servers. Illustratively, the data gathering components 114 may retrieve data from primary storage servers 201 and 202, where each primary storage server 201 and 202 execute backup protocols such as recovery manager (RMAN) 203 and vStorage APIs for Data Protection (VADP).

The secondary storage server 110 includes a file system 210. The file system 210 collaborates with the file systems of other secondary storage servers in the cluster to form a distributed system used to store backup data from the primary storage service 201. For example, assume the bridge components 112 receive a virtual machine disk (VMDK) file from the backup data gathering components 114. In such a case, the bridge components 112 writes the VMDK file to disk storage 160. In addition, file system metadata (e.g., inodes) are stored in SSD 118. However as a VMDK file can be quite large (e.g., terabytes), bridge components 112 may store the VMDK file as a blob (binary large object). The blob may be further divided into a set of chunks (e.g., 8 KB each), which are stored in numerous chunk files. Backup data below a given size threshold (e.g., files less than 256K bytes) could be stored in the SSD 118 directly along with the file system metadata.

Once stored, the bridge components 112 may expose file system 210 to various clients through file system protocols, such as NFS, SMB, and iSCSI. Further, the bridge components 112 may respond to operation requests received from the clients.

Data in the secondary storage server 110 may be stored in distributed B+ trees or blob structures. In one embodiment, data smaller than 256 KB resides in distributed B+ trees, and data larger than 256 KB is stored in blob structures. The secondary storage server 200 may maintain a blob store 214 that contains the blob structures. Each blob may be divided into regions of a particular size, such as 128 KB. These regions, or "bricks," may further contain chunks of data that reference logical files in the SSD 118 and the HDDs 116.

The scribe process 214 maintains the data residing in distributed B+ trees. Further, the scribe process 214 also maintains information about the chunks of data in the blob store 210 in key-value stores (e.g., tree structures). One example key-value store may map blob structures to brick sections. Another store may map bricks to chunks. Yet another store may map chunks to logical files storage drives of the secondary storage server 110.

As stated, the SSDs 118 and HDDs 116 provide tiered storage system, where the SSDs 118 form an upper first tier that stores hot data. As such, the node performs write operations to the SSDs 118. In contrast, the HDDs 116 form a lower tier that generally stores cold data due to larger capacity of HDDs relative to SSDs. The scribe process 214 may store metadata describing the location of the chunks written to SSD and HDD.

Figure 3:
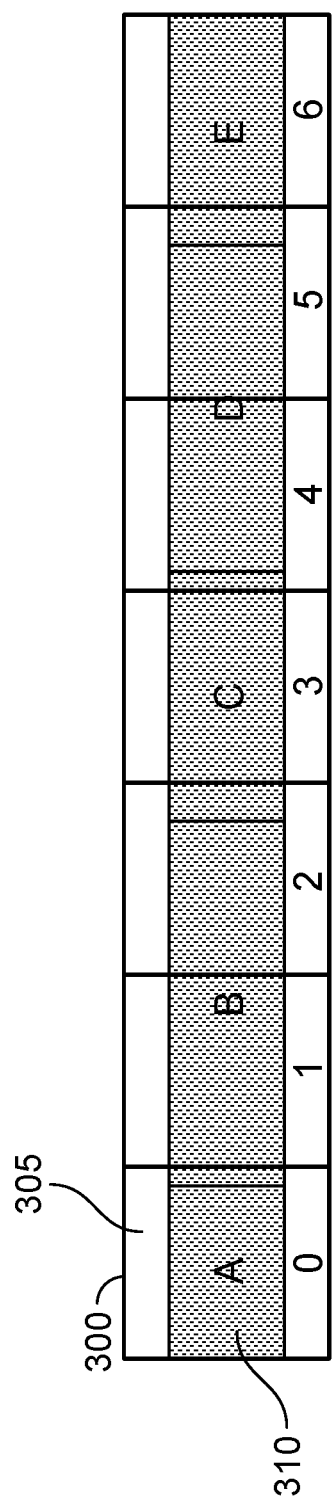
FIG. 3 illustrates an example binary large object (blob) structure, according to one embodiment.

FIG. 3 illustrates a blob 300, according to one embodiment. As stated, file data may be contained within the blob 300. The blob 300 is divided into regions of equal size, or bricks 305 (represented by the numbered regions 0-6). The bricks 305 each contain chunks 310. Each chunk 310 may reference a file stored by the secondary storage server 110. The bricks 305 and chunks 310 may contain identifiers used by the scribe process 214 in key-value stores that map to the stored files.

In one embodiment, a chunk 310 can be either deduplicated or non-deduplicated. In the secondary storage system, incoming write data may be similar or identical to data that has previously been written to disk. In such a case, the chunk 310 representing that data is a deduplicated chunk. Thus, when the node identifies identical data is to be written, the node can create identifier referencing the deduplicated chunk. In addition, because other chunks may reference the deduplicated chunk, the node generally does not overwrite a deduplicated chunk.

Further, in one embodiment, a chunk 310 can be a part of a compressed group of chunks. That is, nodes in the secondary storage system can preserve storage space by compressing data chunks 310. In one embodiment, when updating data of a chunk 310 that is part of a compressed group, the node typically performs an out-of-place write operation to create a new chunk, rather than update the chunk 310 in-place. The node updates file metadata to reference the new chunk. Doing so avoids performance overhead in uncompressing the chunk group, updating the chunk, and re-compressing the chunk group.

Figure 4:
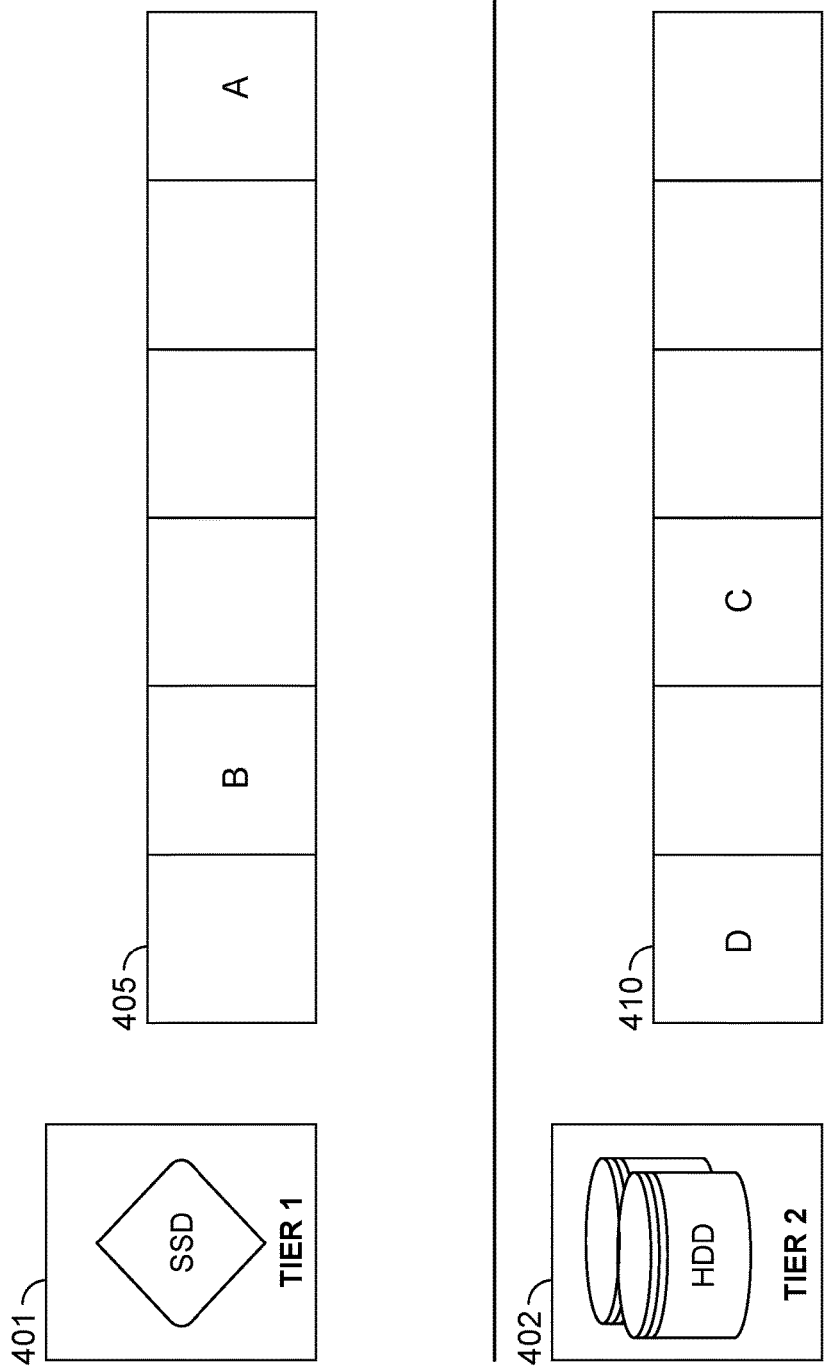
FIG. 4 illustrates a tier-based storage layout in the secondary storage server described in FIG. 2, according to one embodiment.

FIG. 4 illustrates a tier-based storage layout in the secondary storage server 110, according to one embodiment. As stated, the SSDs 118 can provide an upper tier storing hot data, i.e., data that is recently accessed in the secondary storage system. The HDDs 116 generally have larger capacity than the SSDs 118 and provide a lower tier that stores large amounts of backup data. As stated, the secondary storage server 110 optimizes write operations such that hot data is written to chunks stored in the SSDs 118. When a given chunk has not been accessed after a specified period of time, a background process may flush the chunk to the HDDs 116.

Illustratively, FIG. 4 shows a file 405 stored in the SSD 118 in tier 1 401 and a file 410 stored in the HDD 116 in tier 2 402. When bridge components 112 receives a write operation for a portion of a given file, the bridge process first identifies the location of the chunk (if the portion of the file contains prior data), i.e., whether the chunk is stored in tier 1 401 or tier 2 402. In one embodiment, the bridge process identifies the location in a key-value store maintained in the scribe process 214.

If the relevant chunk is stored in tier 1 401 (e.g., such as file 405), then the bridge process typically writes in-place to the identified location in SSD 118. However, in some cases, then the bridge process writes out-of-place, i.e., creates new chunks on SSD or HDD (based on an incoming I/O access pattern) and writes to those chunks. For example, the bridge process does not write to deduplicated chunks in-place because such chunks may be based on a SHA-1 fingerprint and also referenced by other files. Therefore, rather than attempt to overwrite the deduplicated chunk, the bridge process writes a new chunk out-of-place to a new location on storage instead. Another example where the bridge process writes out-of-place is where the chunk is stored as one of many compressed chunks. That is, the writing in place to a chunk that is part of a compressed group incurs significant performance overhead, as the bridge process would need to uncompress the group, update the chunk, and then re-compress the group. When creating a new chunk, the bridge process determines an incoming I/O access pattern. If the access pattern is random, then the bridge process places the chunks sequentially in the SSD. Otherwise, if the access pattern is sequential, then the bridge process places the chunks in the HDD. Doing so allows for subsequent sequential reads on the HDD.

If an overriding condition exists, the bridge process writes the file chunk out-of-place. Illustratively, file chunks A and B are written in different locations on the SSD 118. On the other hand, if the file is stored in tier 2 402 (e.g., such as file 410) and if the access pattern is sequential, the bridge process writes the chunk out-of-place to the HDDs 116.

In one embodiment, a background process periodically scans the SSD 118 to identify chunks that have not been accessed in the SSD for a specified amount of time. The background process transfers such chunks to the HDD 116. Doing so ensures the SSD 118 should have capacity to store hot data over time. The background process also updates the key-value store maintained by the scribe process 214 to reflect the change in location.

Figure 5:
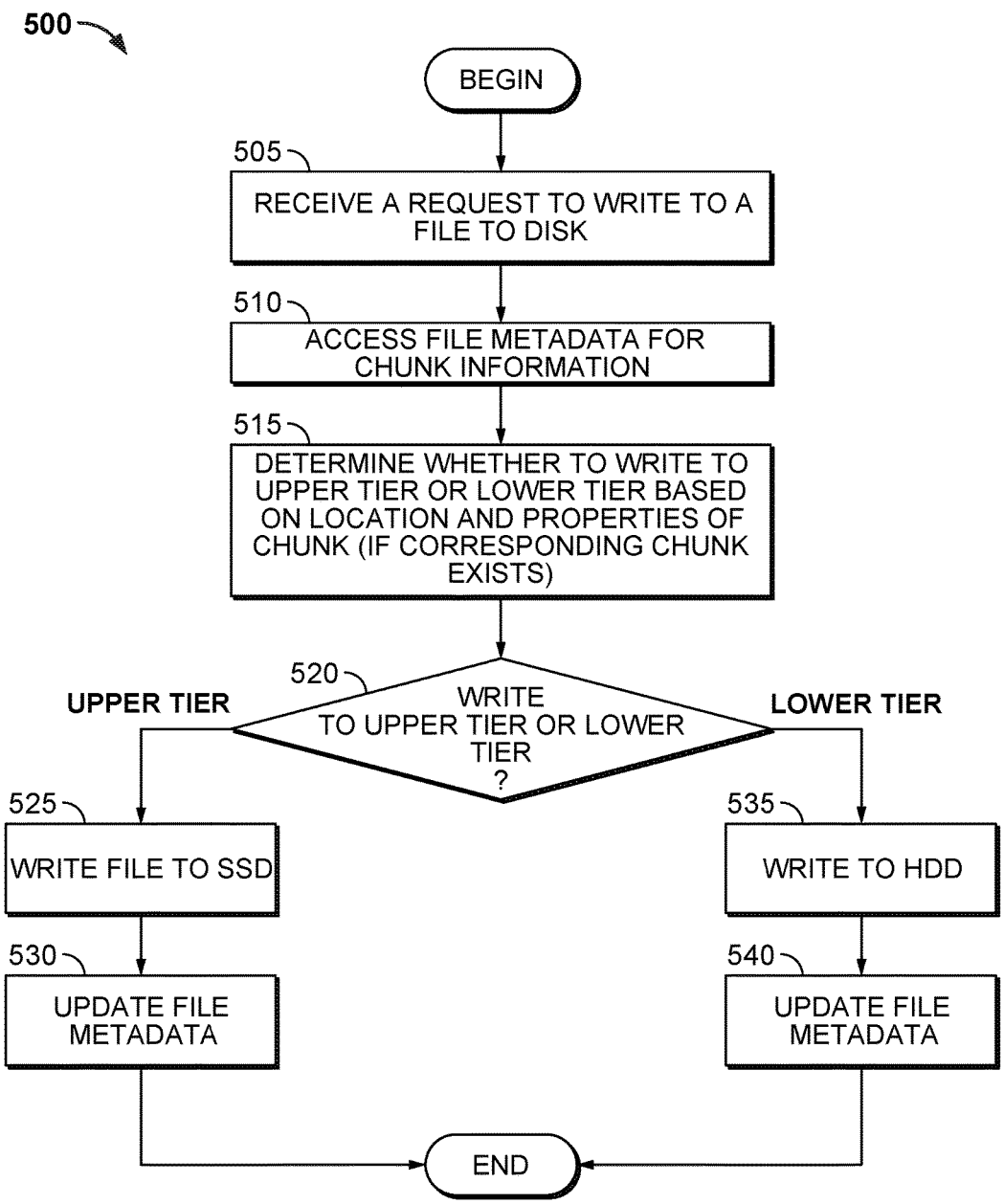
FIG. 5 illustrates a method for performing a write operation, according to one embodiment.

FIG. 5 illustrates a method 500 for performing a write I/O operation, according to one embodiment. Method 500 begins at step 505, where the bridge process receives an incoming request to perform a write operation to a file.

At step 510, the bridge process accesses metadata associated with the file. Such metadata may be located in the key-value mapping tables maintained by the scribe process 214. The metadata can describe various properties of a chunk associated with a portion of a file to be written, such as the location (e.g., whether the chunk is stored on the SSD or HDD), whether the chunk is deduplicated, part of a compressed group, etc. In one embodiment, the scribe process may determine the location of the metadata in the key-value stores. If the portion of the file does not contain any prior data, then a corresponding chunk does not exist for the data. In such a case, the bridge process writes the chunk out-of-place to the appropriate tier (based on an incoming access pattern).

If the data corresponds to an existing chunk, then at step 515, the bridge process determines whether to write the chunk to the upper tier or the lower tier of storage based on the location and properties of the chunk. For example, the bridge process may make such determination based on the current location of the chunk, whether the underlying write operation is random or sequential, whether the chunk is deduplicated, and whether the file chunk is part of a compressed chunk group.

At step 520, the bridge process determines whether to write either to the upper tier or lower tier. If the bridge process determines to write to the upper tier, the bridge process writes to a location on the SSD (step 525). Such determination is based on whether an incoming access pattern of the write operation is random or sequential, as described in more detail below. Further, at step 530, the bridge process updates the file chunk metadata to reflect the update. If the bridge process determines to write to the lower tier, the bridge process writes to a location on the HDD (at step 535). At step 540, the bridge process then updates the file chunk metadata to reference the location on the HDD.

Figure 6:
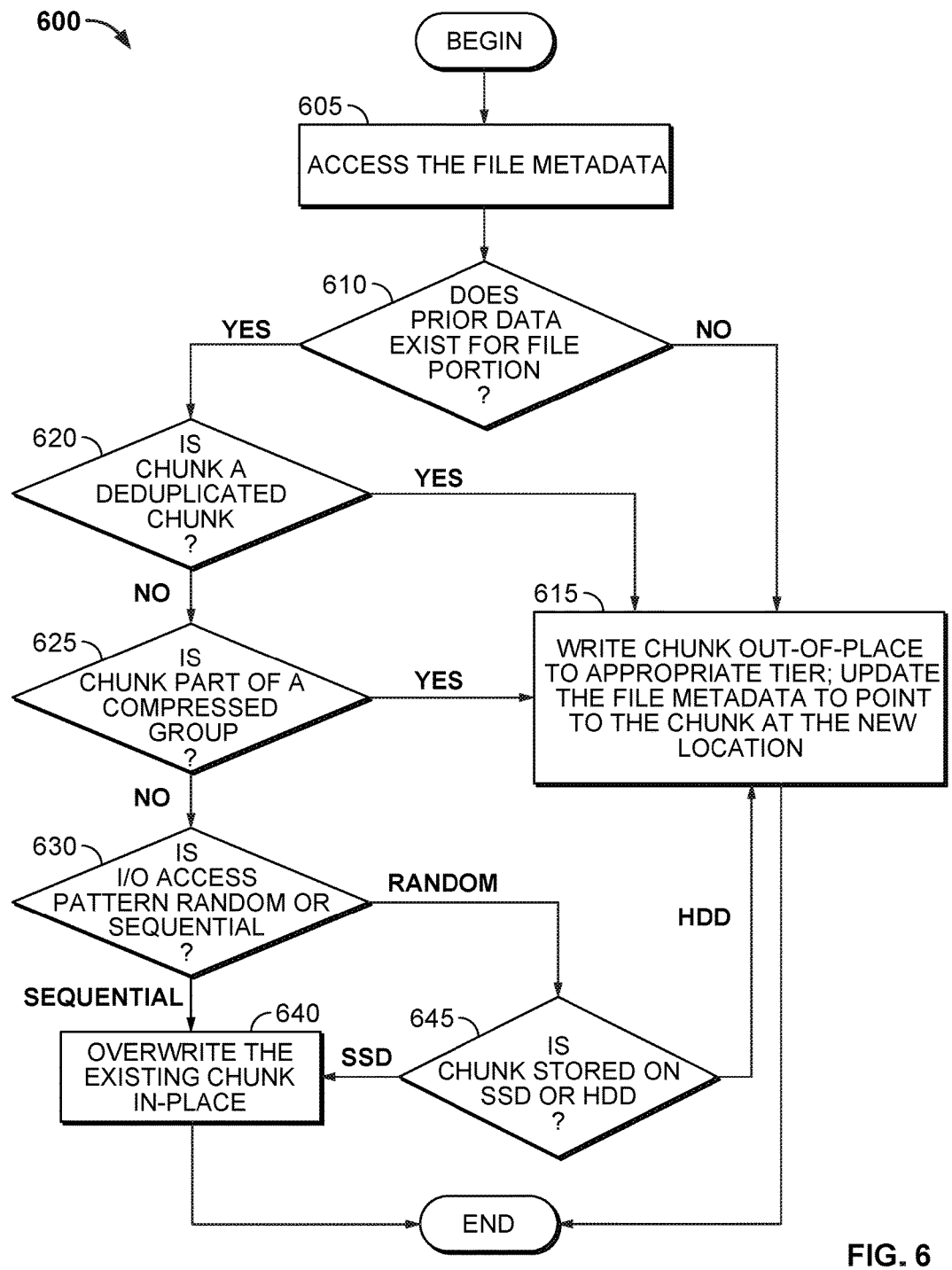
FIG. 6 illustrates a method for determining whether to write a file chunk out-of-place or in-place, according to one embodiment.

FIG. 6 illustrates a method 600 for determining whether to write a chunk to disk in-place or out-of-place, according to one embodiment. As stated, when the bridge process receives an incoming write operation for a portion of a file, the bridge process obtains file metadata from the key-value tables maintained by the scribe process 214. The metadata describes the chunk used to store the file (or portion of the file) in the secondary storage system, if the chunk exists (i.e., the portion of the file contains prior data). At step 605, the bridge process accesses the file metadata. The bridge process may identify the location from the metadata.

At step 610, the bridge process determines whether prior data exists for the file portion. If prior data does not exist, then a corresponding chunk for the data to be written also does not exist. Consequently, at step 615, the bridge process writes the chunk out-of-place to the appropriate tier based on the access pattern. That is, if the access pattern corresponds to a random pattern, then the bridge process writes the chunk to SSD. And if sequential, then the bridge process writes the chunk to HDD.

Otherwise, if prior data does exist (i.e., corresponding chunks also exist), then the bridge process determines whether any existing conditions exist that would cause the bridge process to write the corresponding chunk out-of-place. As stated, examples of overriding conditions include an existing chunk being part of a compressed chunk group or being deduplicated. If a given chunk is written out-of-place, the bridge process also updates the file metadata to point to the chunk at the new location.

For instance, at step 620, the bridge process determines whether the chunk is a deduplicated chunk. In such a case, rather than overwriting the deduplicated chunk, the bridge process should create a new chunk via an out-of-place write operation (at step 615). Therefore, if the chunk is a deduplicated chunk, then the bridge process determines to write the chunk out-of-place. If not, then at step 625, the bridge process determines whether the chunk is part of a compressed chunk group. If so, then the bridge process opts to write the chunk out-of-place (at step 615).

If not, then at step 630, the bridge process determines whether the underlying access pattern is random or sequential. To do so, the bridge process may call a pattern detection process executing within the node. As stated, the pattern detection process tracks streams of incoming I/O operations and identifies whether each pattern is random or sequential. If sequential, then at step 640, the bridge process overwrites the existing chunk in-place. However, if random, then at step 645, the bridge process determines whether chunk is stored on HDD or SSD. If the chunk is stored on the SSD, then the bridge process overwrites the existing chunk in-place (at step 640). Otherwise, if the chunk is stored on the HDD, then the bridge process writes the chunk to a new location out-of-place (at step 615). The bridge process updates the file metadata to point the chunk at the new location.

Figure 7:
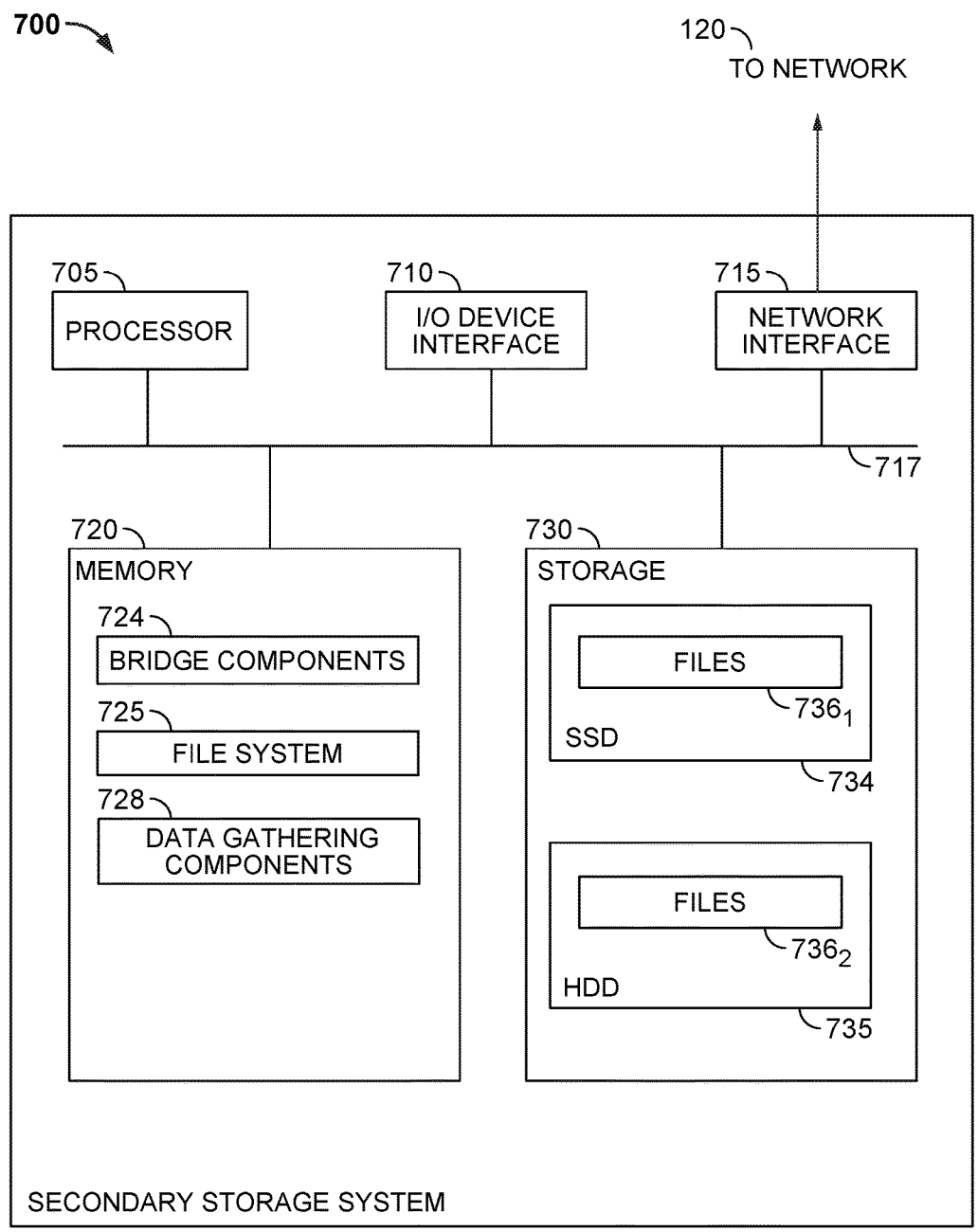
FIG. 7 illustrates a secondary storage system, according to one embodiment.

FIG. 7 illustrates an example secondary storage server 700, according to one embodiment. As shown, computing system 700 includes, without limitation, a central processing unit (CPU) 705, a network interface 715, a memory 720, and storage 730, each connected to a bus 717. Server 700 may also include an I/O device interface 710 connecting I/O devices 712 (e.g., keyboard, display and mouse devices) to the server 700. Further, in context of this disclosure, the computing elements shown in the secondary storage server 700 may correspond to a physical computing system (e.g., a system in a data center).

CPU 705 retrieves and executes programming instructions stored in memory 720 as well as stores and retrieves application data residing in the storage 730. The bus 717 is used to transmit programming instructions and application data between CPU 705, I/O devices interface 710, storage 730, network interface 715, and memory 720. Note, CPU 705 is included to be representative of a single CPU, multiple CPUs, a single CPU having multiple processing cores, and the like. Memory 720 is generally included to be representative of a random access memory. Storage 730 may be a disk drive storage device. Although shown as a single unit, storage 730 may be a combination of fixed and/or removable storage devices, such as fixed disc drives, removable memory cards, or optical storage, network attached storage (NAS), or a storage area-network (SAN).

Illustratively, memory 720 includes bridge components 724, a file system 725, and data gathering components 726. The file system 725 collaborates with the file systems of other secondary storage systems to store backup data from a primary storage system. The bridge components 724 may expose the file system 725 to various clients through file system protocols.

In addition, the bridge components 724 receive incoming random I/O operation requests (e.g., from clients). In turn, the bridge components 724 perform the requested operations. Further, the data gathering components 726 allow the secondary storage server 700 to communicate with primary storage servers and retrieve data from the primary storage servers.

The storage 730 is divided into an SSD 734 and HDD 735. Each drive stores files 735 based on whether the data is recently accessed. More specifically, the SSD 734 serves as a upper tier that stores "hot" data (e.g., files $735_1$), and the HDD 735 serves as a lower tier that stores "cold" data (e.g., files $735_2$). A scribe process may maintain key-value stores that map metadata corresponding to the files 735 to a given location on one of the storage drives (i.e., SSD 734 and HDD 735).

A bridge process receives requests to perform write operations to a file. The bridge process determines whether to write to the file on the upper tier or the lower tier, e.g., by identifying the location of a chunk in file metadata and making the determination based on the location. If the chunk is stored on the HDD, then the bridge process writes to the lower tier. Otherwise, if the chunk is stored on the SSD, then the bridge process writes to the upper tier unless overriding conditions exist. Examples of overriding conditions include whether the chunk is deduplicated, whether the chunk is part of a compressed group, and whether the pattern of I/O operations is random or sequential.

Aspects of the present disclosure may be embodied as a system, method or computer program product. Accordingly, aspects of the present disclosure may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present disclosure may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples a computer readable storage medium include: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the current context, a computer readable storage medium may be any tangible medium that can contain, or store a program for use by or in connection with an instruction execution system, apparatus or device.

The flowchart and block diagrams in the Figures illustrate the architecture, functionality and operation of possible implementations of systems, methods and computer program products according to various embodiments of the present disclosure. In this regard, each block in the flowchart or block diagrams may represent a module, segment or portion of code, which comprises one or more executable instructions for implementing the specified logical function(s). In some alternative implementations the functions noted in the block may occur out of the order noted in the figures. For example, two blocks shown in succession may, in fact, be executed substantially concurrently, or the blocks may sometimes be executed in the reverse order, depending upon the functionality involved. Each block of the block diagrams and/or flowchart illustrations, and combinations of blocks in the block diagrams and/or flowchart illustrations can be implemented by special-purpose hardware-based systems that perform the specified functions or acts, or combinations of special purpose hardware and computer instructions.

The foregoing description, for purpose of explanation, has been described with reference to specific embodiments. However, the illustrative discussions above are not intended to be exhaustive or to limit the disclosure to the precise forms disclosed. Many modifications and variations are possible in view of the above teachings. The embodiments were chosen and described in order to best explain the principles of the disclosure and its practical applications, to thereby enable others skilled in the art to best utilize the disclosure and various embodiments with various modifications as may be suited to the particular use contemplated.

While the foregoing is directed to embodiments of the present disclosure, other and further embodiments of the disclosure may be devised without departing from the basic scope thereof, and the scope thereof is determined by the claims that follow.

What is claimed is:

1. A method for storing data, the method comprising:
   receiving a request to write data corresponding to at least a first portion of a file;
   determining whether to perform the request either as an in-place write or as an out-of-place write, wherein performing the in-place write comprises performing a write to a low latency storage device, and performing the out-of-place write comprises performing a write to a higher latency storage device; and
   performing the request as either the in-place write or the out-of-place write based on the determination, wherein performing the request as the in-place write includes writing the data to a first location on a storage tier storing the first portion of the file, and performing the request as the out-of-place write includes writing the data to a second location on one of a plurality of storage tiers of a computing node, other than the first location.

2. The method of claim 1, wherein it is determined to perform the request as the out-of-place write including by determining that the first portion of the file corresponds to a deduplicated portion.

3. The method of claim 1, wherein it is determined to perform the request as the out-of-place write including by determining that the first portion of the file corresponds to a compressed group of portions from one or more files.

4. The method of claim 1, further comprising:
   recording a pattern of input or output operations to one or more portions of the file.

5. The method of claim 4, further comprising:
   determining, based on the recorded pattern of the input or output operations, whether to perform the request as either the in-place write or as the out-of-place write.

6. The method of claim 5, wherein determining, based on the recorded pattern of the input or output operations, whether to perform the request as the out-of-place write comprises:
   determining that the recorded pattern of input or output operations corresponds to a sequential pattern of input or output operations.

7. The method of claim 5, further comprising:
   determining, based on the recorded pattern of the input or output operations, whether to write the data to the first location on the storage tier which currently stores the first portion of the file or to the second location on one of the storage tiers, other than the first location.

8. The method of claim 1, wherein the computing node is a node of a secondary storage system.

9. A system, comprising:
   a processor; and
   a memory coupled with the processor, wherein the memory is configured to provide the processor with instructions which when executed cause the processor to:

receive a request to write data corresponding to at least a first portion of a file;

determine whether to perform the request either as an in-place write or as an out-of-place write, wherein performing the in-place write comprises performing a write to a low latency storage device, and performing the out-of-place write comprises performing a write to a higher latency storage device; and perform the request as either the in-place write or the out-of-place write based on the determination, wherein performing the request as the in-place write includes writing the data to a first location on a storage tier storing the first portion of the file, and performing the request as the out-of-place write includes writing the data to a second location on one of a plurality of storage tiers of a computing node, other than the first location.

10. The system of claim 9, wherein it is determined to perform the request as the out-of-place write including by determining that the first portion of the file corresponds to a deduplicated portion.

11. The system of claim 9, wherein it is determined to perform the request as the out-of-place write including by determining that the first portion of the file corresponds to a compressed group of portions from one or more files.

12. The system of claim 9, wherein the memory is further configured to provide the processor with instructions which when executed cause the processor to:

record a pattern of input or output operations to one or more portions of the file.

13. The system of claim 12, wherein the memory is further configured to provide the processor with instructions which when executed cause the processor to:

determine, based on the recorded pattern of the input or output operations, whether to perform the request as either the in-place write or as the out-of-place write.

14. The system of claim 13, wherein determining, based on the recorded pattern of the input or output operations, whether to perform the request as the out-of-place write comprises:

determining that the recorded pattern of input or output operations corresponds to a sequential pattern of the input or output operations.

15. The system of claim 13, wherein the memory is further configured to provide the processor with instructions which when executed cause the processor to:

determine, based on the recorded pattern of the input or output operations, whether to write the data to the first location on the storage tier which currently stores the first portion of the file or to the second location on one of the storage tiers, other than the first location.

16. The system of claim 9, wherein the computing node is a node of a secondary storage system.

17. A computer program product for storing data, the computer program product being embodied in a non-transitory computer readable storage medium and comprising computer instructions for:

receiving a request to write data corresponding to at least a first portion of a file;

determining whether to perform the request either as an in-place write or as an out-of-place write, wherein performing, the in-place write comprises performing a write to a low latency storage device and performing the out-of-place write comprises performing a write to a higher latency storage device; and performing the request as either the in-place write or the out-of-place write based on the determination, wherein performing the request as the in-place write includes writing the data to a first location on a storage tier storing the first portion of the file, and performing the request as the out-of-place write includes writing the data to a second location on one of a plurality of storage tiers of a computing node, other than the first location.

18. The computer program product of claim 17, wherein it is determined to perform the request as the out-of-place write including by determining that the first portion of the file corresponds to a deduplicated portion.

19. The computer program product of claim 17, wherein it is determined to perform the request as the out-of-place write including by determining that the first portion of the file corresponds to a compressed group of portions from one or more files.

20. The computer program product of claim 17, further comprising computer instructions for recording a pattern of input or output operations to one or more portions of the file.

* * * * *